Figure 1:
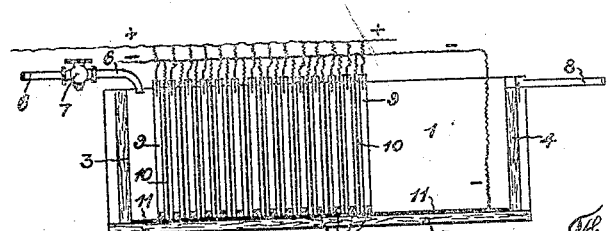

No. 835,329. PATENTED NOV. 6, 1906.
J. SNODGRASS.
MEANS FOR PRECIPITATING GOLD AND SILVER.
APPLICATION FILED JAN. 3, 1906.

2 SHEETS—SHEET 1.

Witnesses:
Inventor:
James Snodgrass

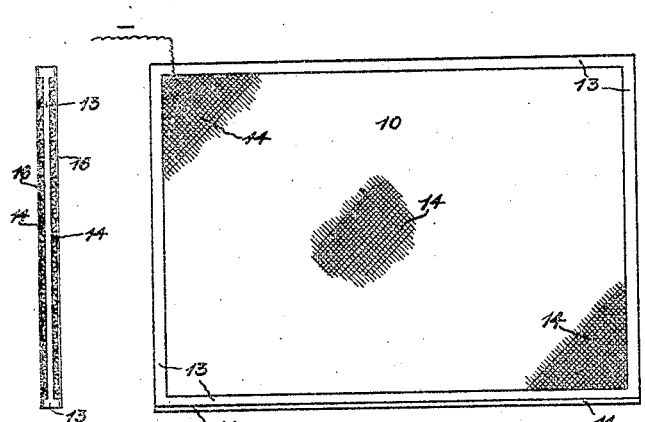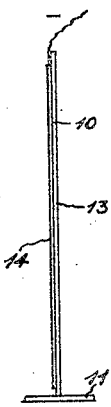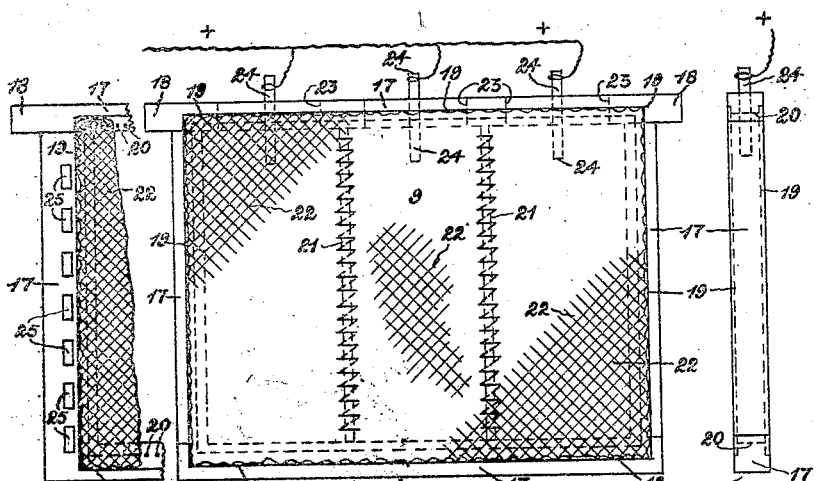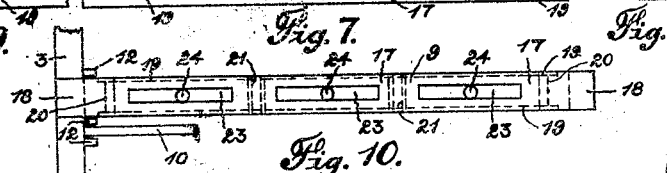

UNITED STATES PATENT OFFICE.

JAMES SNODGRASS, OF JOHANNESBURG, TRANSVAAL.

MEANS FOR PRECIPITATING GOLD AND SILVER.

No. 835,329. Specification of Letters Patent. Patented Nov. 6, 1906.

Application filed January 3, 1906. Serial No. 294,457.

*To all whom it may concern:*

Be it known that I, JAMES SNODGRASS, a subject of the King of Great Britain, and a resident of Johannesburg, Transvaal, have invented certain new and useful Improvements in Means for Precipitating Gold and Silver from Cyanid or other Solutions, of which the following is a specification.

This invention relates to means for effecting the extraction of gold and silver from cyanid or other solutions.

As compared with the processes presently most commonly adopted I obtain, among others, the following important advantages, namely: I obtain a higher or more complete extraction of the precious metals, I obviate the necessity for the employment of zinc, the "clean up" is effected with less loss of the precious metals and a finer bullion is produced, and a plant embodying the present improvements may be no larger than an existing plant in which zinc is employed.

A valuable feature of the invention lies in the fact that the present precipitation or extractor-boxes can be readily adapted for use with my invention.

The improvements have especial reference to that kind of apparatus in which porous or permeable electrodes are employed. In one process in which the use of such permeable or pervious electrodes has been suggested the solvent solution containing the precious metals was collected in a storage tank or receiver, then circulated through the extractor-box containing said permeable electrodes and from the extractor-box back to the storage-tank rapidly and repeatedly to bring the solution into intimate contact with the anodes and cathodes in rapid alternation until the precious metal contained in the solution had been sufficiently reduced. It has also been proposed, circumstances permitting, to utilize the ore-treatment tank as a storage-tank and to repeatedly return the solution from the extractor-box to the ore-treatment tank. As compared with this process my invention gives the following important advantages, namely: I obviate all necessity for the repeated circulation of the solution through the extractor-box, and consequently obviate the attendant disadvantages of such repeated circulation—as, for example, the diffusion or mixing of the solution from which the precious metal has been extracted or partially extracted with the original solution. Further, the process referred to is more or less intermittent, as only a given quantity of the solution, limited, of course, by the capacity of the storage tank, can be treated at one time, whereas by my invention the process of extraction can be carried on continuously, the quantity of solution capable of being treated being only limited by the deposition in the extractor-box of sufficient of the precious metal to impede or interfere with the efficient working of the apparatus.

To facilitate the further description of my invention and the manner of putting the same into practice, I append drawings, in which—

Figure 2:
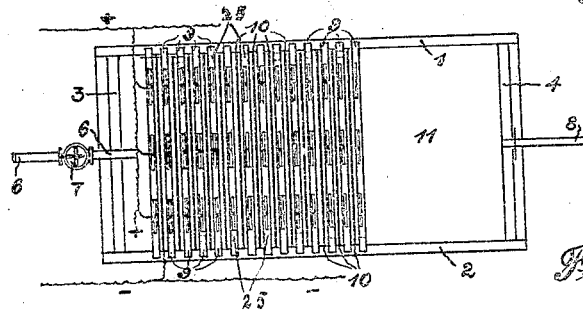
Figure 3:
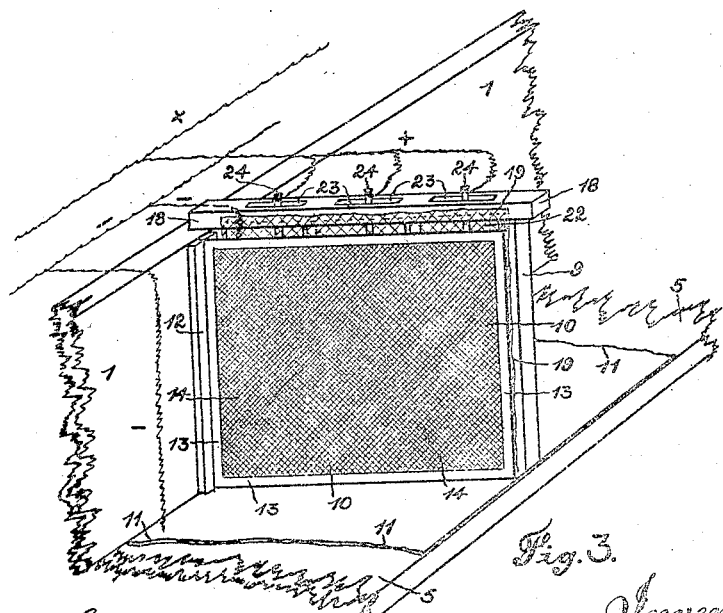

Figure 1 represents the extractor-box in side elevation with the side of the box removed. Fig. 2 is a plan of Fig. 1. Fig. 3 is an isometric perspective view of a portion of the box and illustrating the permeable electrodes. Fig. 4 is a front elevation of one of the permeable cathodes detached and showing it in conjunction with an iron plate placed in the bottom of the extractor-box, on which the cathodes rest. Fig. 5 is an end elevation of Fig. 4. Fig. 6 is an end elevation illustrating a modified construction of the cathode. Fig. 7 is a front elevation of one of the permeable anodes detached. Fig. 8 is an end elevation of Fig. 7. Fig. 9 is a front elevation of a portion of a cathode, illustrating a modification; and Fig. 10 is a plan of the cathode and showing a portion of one side of the extractor-box and a means of retaining the anodes and cathodes in position in the box.

The extractor-box, which may be of wood or other suitable material, consists of the two vertical sides 1 2, the two ends 3 4, and the bottom 5, leaving the top open. A pipe 6, fitted with a valve 7, serves for introducing the solution containing the precious metal into the extractor-box at the receiving end, and a pipe 8, communicating with the other end of the extractor-box, forms the outlet or serves for conducting the solution away from the box.

In the several views the electric wires or conductors are marked, respectively, + and —. The positive conductor is connected with the several anodes 9 and the negative conductor with the intervening cathodes 10.

In the bottom of the box is placed a sheet 11, of iron or other metal of a suitable degree of conductivity, which serves for electrically connecting all the cathodes 10. The negative conductor may also, if desired, as shown in Figs. 1 and 3, be connected to this iron or other suitable plate 11. The plate is shown extending the full length and width of the box.

For the purpose of supporting the anodes 9 and cathodes 10 in position vertically inside the box cleats or strips 12 of a suitable non-conducting material are fixed to the sides of the box on the inside, as shown in Figs. 3 and 10. The anodes 9 and the intervening cathodes 10 are placed at suitable distances apart.

The several cathodes 10, as seen more particularly in Figs. 4 and 5, consist of a rectangular iron or other suitable metal frame 13, corresponding in width and height to the width and height of the extractor-box. Upon this frame 13 is placed a rectangular piece of fine wire-gauze 14, preferably of iron. This forms an important feature of my invention, and in order to obtain satisfactory results it is necessary that very fine screening be employed. I have obtained highly-satisfactory results from a screening providing ten thousand meshes per square inch, although screening providing from one thousand up to forty thousand meshes per square inch might be employed with varying degrees of success—in fact, the finer the mesh the better the extraction. As previously stated, the frames 13 of the whole series of cathodes 10 rest directly upon the iron plate 11 in the bottom of the box, which forms electrical connection between all the cathodes 10.

Instead of employing the very fine wire-gauze 14 for the cathode 10, I may employ a woven cloth or fabric of a suitably fine texture and stretch it upon the rectangular frame 13 and render said cloth a conductor by a coating of plumbago. The conductivity of this form of cathode may be increased by saturating or dipping the cloth, either before or after coating it with the plumbago, first, into a solution of a lead salt or salt of other heavy metal, and, secondly, into a solution of an alkaline carbonate or sulfate. By this means a deposit of carbonate or sulfate of lead is formed on the fibers of the cloth, and after the cathodes have been placed in position in the box the first passage of the electric current reduces the lead to the metallic state, and so increases the conductivity.

Instead of employing the very fine wire-gauze 14 or the woven cloth or fabric as above described I may use a combination of same. This construction of cathode is shown in Fig. 6, in which the frame of iron is represented at 13. The fine wire-gauze 14 is laid upon the rectangular frame and over it is placed the woven cloth or fabric 16, which is secured round the edges to the frame. As shown in Fig. 6, the gauze 14 and cloth 16 are placed at each side of the frame, although it will be evident that they may be placed on one side of the frame only, if desired. By employing a cathode of the construction just described the number of electrodes required is reduced.

The several anodes 9, which are interspaced with the cathodes 10, comprise, as seen in Figs. 7 to 10, a frame 17, of wood or other suitable non-conducting material. This frame 17 is made of substantially the same width as the extractor-box, and preferably projects slightly higher than the box, the top horizontal member being formed with lateral extensions 18, which rest upon the top edges of the vertical sides 1 2 of the box. The ends of the frame 17 slide down the slots formed between the cleats or strips 12, fixed to the sides of the box. When in position, the bottom of the frame 17 rests upon the iron plate 11, and so prevents the passage of the solution between the bottom or sides of the frame and the bottom or sides of the box. Round the inner edges of the frame 17 is formed a recess 19, and in the bottom of this recess 19 and through the frame 17 are formed holes 20. Between the two vertical sides of the frame 17 are secured the two vertical stiffening-bars 21, which are preferably placed equidistant from each other and from the ends. In the recess 19 at each side of the frame 17 is placed a piece of porous cloth 22 of a very open texture, such as flax scrim. These pieces of textile material cover the center of the frame and form between them a narrow compartment or compartments. The textile material 22 is sewed or laced round its edges through the holes 20, formed through the frame 17. It is also preferably laced or sewed, as seen in Figs. 7 and 10, to the vertical stiffening-bars 21.

The compartments formed between the pieces of textile material 22 are filled with an insoluble conductor in the form of powder or small lumps. For the sake of cheapness I prefer to employ gas carbon or coke, although graphite, binoxid of manganese, and peroxid of lead may be employed and will be found equally suitable, although more expensive. The binoxid of manganese and peroxid of lead are not acted upon by the solvent solution and do not introduce any impurities into the cyanid solution.

In the top horizontal member of the wooden frame 17 are formed three slots 23, (see Figs. 7 and 10,) one slot for each of the three compartments. In these slots 23 are placed sticks or pieces of carbon 24, which at their inner ends project down for a suitable distance into the substance which is filled into the compartments. At their other ends the carbons 24 are attached to the positive conductor in any suitable manner.

The electrodes (cathodes and anodes) prepared as above described are arranged inside the wooden box, (see Figs. 1, 2, and 3,) being placed alternately and as close together as possible. The gold or silver bearing solution is then conducted by the inlet-pipe 6 into the extractor-box, the quantity entering the box being suitably regulated by means of the valve 7 and the solution made to pass slowly through the box transversely to the electrodes 9 10 in such a manner that it is compelled to pass through the porous cathodes 10 and is thereby thoroughly subjected to the action of the conductive fibers or wire-gauze 14 and the precious metals thereby deposited thereupon. As a result a much smaller cathode-surface is required than in other ordinary electrical processes.

By using the plate 11 as above described I prevent the redissolution of any particles of gold that may become detached from the cathode 10 and come into contact with the plate.

It is not absolutely necessary that the solution should pass through those portions of the anodes covered by the fabric. Indeed, in the case of acid solutions it is desirable that they should not be compelled to do so, and for such solutions each anode, as shown in Fig. 9, may have formed down one side a suitable number of holes 25, the holes being placed alternately in opposite sides of the several frames, through which the solution may pass in a sinuous course through said anodes. Alternatively the solution may flow round the opposite ends of alternate anodes. By these constructions of anode the separation of cyanid of gold on the anode is practically obviated.

What I claim as my invention, and desire to protect by Letters Patent, is—

1. Apparatus for precipitating metals comprising a receptacle, a common cathode-conductor therein, and alternately-disposed anodes and cathodes in said receptacle, each of said cathodes comprising a conductive screen of fine mesh in electrical contact with said common conductor but not secured thereto, substantially as described.

2. Apparatus for precipitating metals comprising a receptacle, a common cathode-conductor therein, and alternately-disposed anodes and cathodes in said receptacle, each of said cathodes comprising a metallic frame and a conductive screen of fine mesh, said frame being in electrical contact with said common conductor but not secured thereto, substantially as described.

3. Apparatus for precipitating metals comprising a receptacle, a common cathode-conductor therein, and alternately-disposed anodes and cathodes in said receptacle, each of said cathodes comprising a metallic frame and a metallic screen of fine mesh, said frame being in electrical contact with said common conductor but not secured thereto, substantially as described.

4. In apparatus for precipitating metals, a cathode comprising a metallic frame and a fabric having a conductive coating and a metallic screen of fine mesh secured to said frame; substantially as described.

5. In apparatus for precipitating metals, a cathode comprising a metallic screen of fine mesh and a fabric having a conductive coating; substantially as described.

6. In apparatus for precipitating metals, a cathode comprising a metallic frame, a metallic screen of fine mesh secured to each side of said frame, and a fabric having a conductive coating over said metallic screen; substantially as described.

7. Apparatus for precipitating metals comprising a receptacle, anodes and cathodes alternately disposed therein, non-conductive frames for said anodes, conductive frames for said cathodes, and a common conductor in contact with each of said frames and electrically connected with said cathodes.

8. In apparatus of the nature indicated, the combination with a receptacle of a plurality of alternating permeable anodes and cathodes, passages being provided in proximity to opposite sides of adjacent anodes for the solution to flow in a sinuous course through the receptacle without passing through the anodes, substantially as described.

9. In apparatus of the nature indicated, the combination with a receptacle of the alternating permeable anodes and cathodes, the frames carrying the anodes having formed in the sides slots or holes to permit the solution to flow through the receptacle in a sinuous course and without passing through the anodes, substantially as described.

10. In apparatus of the nature indicated, the combination with a receptacle of the alternating permeable anodes and cathodes, passages being provided in proximity to opposite sides of adjacent anodes for the solution to flow in a sinuous course through the receptacle without passing through the anodes, the cathodes being constructed on a metal frame, and a metal plate placed in the receptacle upon which the cathodes rest and by means of which they are placed in electrical connection, substantially as described.

In witness whereof I have hereunto set my hand in the presence of two subscribing witnesses.

JAMES SNODGRASS.

Witnesses:
CHAS. OVENDALE,
R. OVENDALE.